(Model.)

M. E. PERRING.
BAND CUTTER AND FEEDER FOR THRASHING MACHINES.

No. 268,372. Patented Nov. 28, 1882.

WITNESSES:
Thos. Houghton.
John C. Kenion

INVENTOR:
M. E. Perring
BY
ATTORNEYS.

UNITED STATES PATENT OFFICE.

MERRICK E. PERRING, OF EAU CLAIRE, MICHIGAN.

BAND-CUTTER AND FEEDER FOR THRASHING-MACHINES.

SPECIFICATION forming part of Letters Patent No. 268,372, dated November 28, 1882.

Application filed January 30, 1882. (Model.)

*To all whom it may concern:*

Be it known that I, MERRICK E. PERRING, of Eau Claire, in the county of Berrien and State of Michigan, have invented a new and Improved Grain-Feeder for Thrashing-Machines; and I do hereby declare that the following is a full, clear, and exact description of the same, reference being had to the accompanying drawings, forming part of this specification.

This invention relates to improvements in band-cutters and feeders for thrashing-machines, and has for its object, in common with others, first, to effect the severing of the band, wire, cord, or other material around the bundle of grain when thrown into the feeder; secondly, to facilitate the feeding of the grain; thirdly, to cause the automatic operation of the band-cutter; and, fourthly, to vary the speed of the feeding operation of the machine.

The nature of this invention consists in combining with the feed-rolls a hopper affixed to the table, and having concaved or V-shaped troughs provided with cutters.

It consists, further, in combining with the feed-rolls, one of which has spiral blades, of the hopper having the shears, one blade fixed thereto, and the pivoted blade having an arm struck by one of the feed-rolls, substantially as hereinafter more fully set forth.

Figure 1:
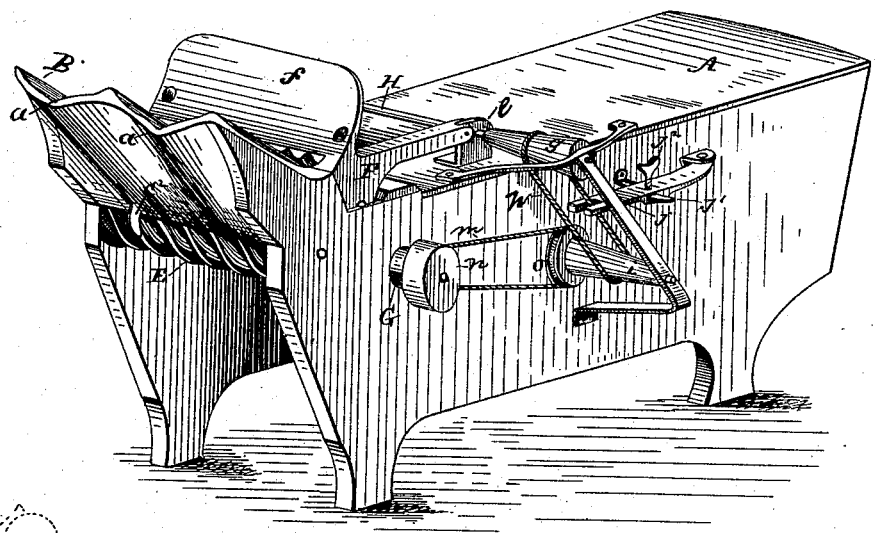
Figure 2:
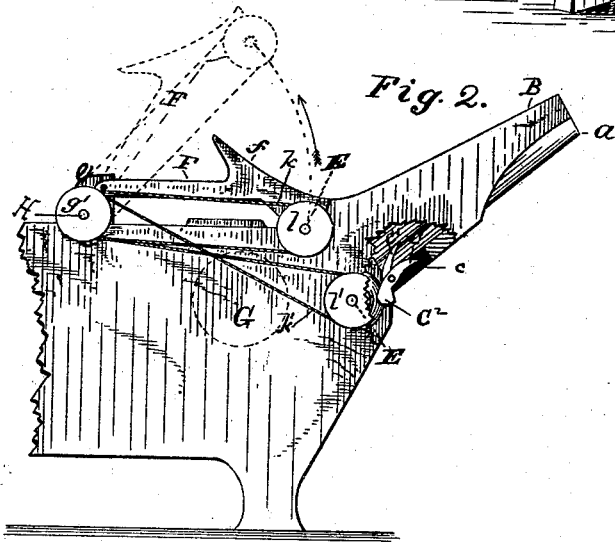
Figure 3:
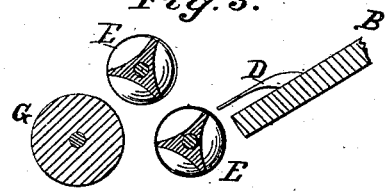

In the accompanying drawings, Figure 1 is a perspective view thereof, and Figs. 2 and 3 are detailed views of the same.

A indicates a table or platform suitably supported upon legs. At front end of the table is located the feed-hopper B, formed with two V-shaped or concaved troughs or chutes, $a\ a$, to provide for feeding the grain in bundles at two separate points to the feed-rolls, and consequently over an extended area to the thrasher. The lower end of the hopper is disposed contiguous to the feed-rolls, to which the grain is fed by the same.

Hung in a slot, $c$, in either one of the troughs of the hopper B is the wire-band cutter or shears C C', arranged close to the feed rolls or shafts, as seen in Fig. 2. The blade C' of the shears or cutter is fixed to the side of the slot $c$, and is curved upward and forward to intercept and pass between the binding-wire and bundle of grain as it slides down the incline of the trough. The blade C is pivoted in the same slot and alongside of the blade C', is of sickle form, and has its upper or curved surface formed with a cutting-edge, which is moved past the oppositely-curved surface or edge of the blade C' to effect the severing of the band. For this purpose the blade C has its inner or lower end extended at $C^2$, to be struck by spiral blade of the lower feed-roll when the band caught between the blades passes upon its cutting-edge, which will be more fully referred to presently.

For cutting a twine band or cord, a simple blade, D, preferably of the form shown in Fig. 3, may be used. It is fastened in the bottom of the other trough of the hopper B and pointed toward the feed-rolls, it having a cutting-edge to sever the cord or twine.

E E are the feed-rolls, spirally bladed and hung one above the other, the shaft of the lower one having its bearings in the sides of the table or platform A about in line with the inclined plane of the hopper-troughs $a\ a$. The shaft of the other feed-roll has its bearings in the forward ends of the side bars of the frame F, hinged or pivoted at the rear ends of its side bars to lugs or projections $e$, fastened upon the table or platform A. The upper feed-roll being hung in the pivoted frame F, it is adapted to accommodate the passage between it and the lower feed-roll of different-sized bundles or gavels of grain. It can also be lifted to the dotted-line position indicated in Fig. 2 when desired. This arrangement permits the lifting of the upper roll out of the way when convenient access may be desired to the lower feed-roll for any purpose. Affixed to the upper side of the said frame at its forward end is a transverse inclined board or guard, $f$, sloping toward the hopper B. This guard will, should any grain be thrown upward or farther forward than the feed-rolls, deflect it downward into the proper channel to the said rolls.

G is the thrashing-cylinder, its teeth not being shown here, as it forms no part of this invention, which acts upon the grain as it leaves the feed-rolls.

H is a transverse shaft, having bearings in the lugs or projections $e$, and having a tapering pulley, $g$, on one end and a pulley, $g'$, on the other end. This shaft H is driven by a belt, $h$, passed around it, and a second tapering pulley, $i$, suitably hung upon a shaft, supported as shown, or otherwise. Motion is transmitted to the pulley $i$ by a belt receiving motion from the thrashing-machine. The pulleys $g$ $i$ may each be replaced by a cone of pulleys, which serve the same purpose—namely, to vary the speed of the feeder, to cause the feeding of the grain slow, rapid, or at a moderately fast or slow speed, as may be desired. To aid this action of the pulleys, a belt-shipper, $j$, is used, hinged or pivoted to a bracket on the side of the table A. The shipper is held by a set-screw, $j^2$, upon a segmental bar, $j'$, secured to the table, while the slot in its bifurcated end receives the belt $h$. The pulley $g'$ of the shaft H drives the feed-rolls by means of belt $k$, passed around a pulley, $l'$, on the shaft of the upper feed-roll, and by a crossed belt, $k'$, passed around a pulley, $l'$, on the shaft of the lower feed-roll, both of said belts being also passed around the pulley $g'$. The apron-cylinder is driven by a belt, $m$, arranged on the opposite side of the table, and passed around the pulley $n$ on the shaft of said cylinder and a second pulley, $o$, on the shaft of or affixed to the pulley $i$.

It will be observed that when the bundles of grain are thrown into or placed in the hopper (those bound with wire being thrown into the trough having the shears C C' and those bound with twine or cord being thrown into the trough having the cutter D) the wire-bands of the former bundles will catch under the point of the blade C' of the shears. Immediately following this the action of the feed-rolls E, grasping the forward end of the bundle, will pull the bundle forward, causing its band to act upon or be brought into forcible contact with the blade C. This will cause the arm $C^2$ of the latter to be thrown against the spiral blade of the lower feed-roll, when its action will instantly force the cutting-edge of the said blade C against the wire and carry it in contact with the blade C', and thus sever the binding-wire. The twine, bands, or cords of the bundles thrown into the other trough of the hopper will be severed by the cutter D as they are drawn over the cutter by the grasping action of the feed-rolls. When the sheaves or bundles are all bound with wire the wire-band cutters or shears are used in both troughs of the hopper. When the sheaves are all bound with twine or cord the cutters D are used in both troughs of the hopper.

The subdivision of the hopper into two feeding-troughs permits the alternate feeding of the bundles of grain, increasing its feeding capacity. It also enables the passing or feeding of the grain over an extended area or surface of apron to the thrashing-machine.

I claim and desire to secure by Letters Patent—

1. In a band-cutter and feeder, the combination, with the feed-rolls, of the hopper affixed to the table, and having concaved or V-shaped troughs provided with cutters, substantially as and for the purpose set forth.

2. In a band-cutter and feeder, the combination, with the feed-rolls, one of which has spiral blades, of the hopper having the shears C C', one blade fixed thereto, and the pivoted blade having an arm, $C^2$, struck by one of the feed-rolls, substantially as and for the purpose set forth.

MERRICK E. PERRING.

Witnesses:
EDWIN S. STEVENS,
ETTA PERRING.